United States Patent Office 3,562,335
Patented Feb. 9, 1971

3,562,335
4,4′-BIS(CHLOROALKOXY)BIPHENYLS
David R. Gildersleve, Kent, England, assignor to Pfizer Inc., New York, N.Y., a corporation of Delaware
No Drawing. Continuation-in-part of application Ser. No. 589,207, Oct. 25, 1966. This application Mar. 19, 1969, Ser. No. 808,657
Claims priority, application Great Britain, June 23, 1966, 28,140/66
Int. Cl. C07c *43/28*
U.S. Cl. 260—613       3 Claims

ABSTRACT OF THE DISCLOSURE

Antiviral agents of the formula:

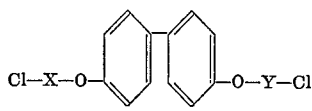

wherein X and Z are each alkylene of 2 to 7 carbons, and the preparation thereof.

CROSS-REFERENCE TO RELATED APPLICATION

This application is a continuation-in-part of patent application, Serial Number 589,207, filed Oct. 25, 1966 and now abandoned.

SUMMARY OF THE INVENTION

This invention comprises novel compounds possessing anti-viral activity having the general formula:

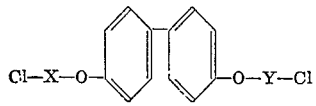

wherein X and Y are each alkylene, straight or branched chain, containing from 2 to 7 carbon atoms.

DETAILED DESCRIPTION OF THE INVENTION

This invention relates to certain novel and useful biphenyl compounds. In particular, it is concerned with 4,4′-disubstituted biphenyl derivatives having the following formula:

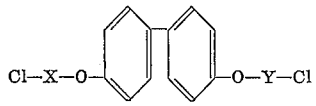

wherein X and Y are each alkylene, branch or straight-chained, having from 2 to 7 carbons. It is to be understood that carbon skeleton branching is possible with regard to X and Y and such isomers are within the scope of this invention.

Specific examples of compounds encompassed by the above structural formula include: 4,4′-bis(2-chloroethoxy)biphenyl and 4,4′-bis(3-chloropropoxy)biphenyl.

The novel compounds contemplated by the scope of this invention can be prepared by a series of facile steps, all of which comprise standard organic techniques familiar to those trained in the art. This can best be illustrated by the following reaction scheme:

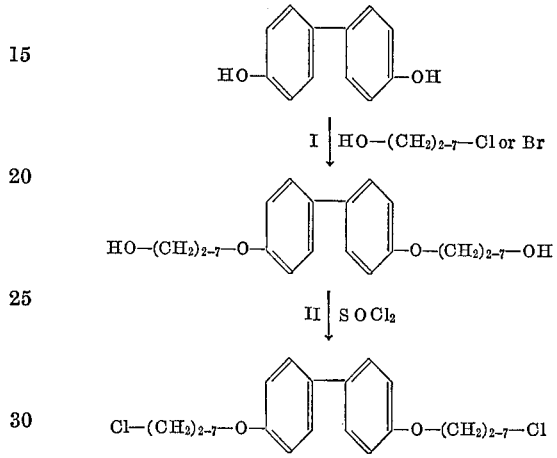

Reaction step I is the simple condensation reaction between p,p′-biphenol and a chloro or bromo substituted alkanol. Said alkanol can of course be a branched isomer as well as the straight-chain alcohol. The reaction is carried out in the following manner using the mole-wise ratio of reagents indicated: p,p′-biphenol (1 M) is dissolved in a 10% weight/volume sodium hydroxide solution (2 M) and the solution heated and stirred under reflux. Insofar as the base used, potassium hydroxide and lithium hydroxide will work equally as well. The chloro or bromo substituted alkanol, for example, 2-bromoethanol or 2-chloroethanol, is then added at a rate as to maintain the system under reflux. The aforementioned chloro or bromo substituted alkanols are either commercially available or can be prepared by well-established organic techniques.

The resulting mixture above, after allowed to stand for a period of up to 20 hours, is then poured into an excess of a 10% NaOH aqueous solution. The crude product which precipitates, is filtered and recrystallised from a suitable solvent, for example ethanol. To prepare dihydroxy compounds in which the alkylene grouping $(CH_2)_{2-7}$ on either side of the molecule is different due to the number of methylene units or because of carbon skeleton branching, successive condensation reactions are carried out. For instance, to obtain 4-(2-hydroxyethoxy)-4′-(3-hydroxy-2-methylpropoxy)biphenyl, a first condensation can be performed with 3-chloro-2-methylpropanol and p,p′-biphenol in the presence of 1 molecular equivalent of sodium hydroxide to obtain 4-hydroxy-4′-(3-hydroxy-2-methylpropoxy)biphenyl, this product being then condensed under similar conditions with 2-bromoethanol.

Reaction step II concerns the well-known technique of converting a hydroxy function to the corresponding chloro derivative with an appropriate chlorinating agent. Regarding the said chlorinating agent, thionyl chloride is most frequently used and is the one of choice insofar as the present disclosure is concerned. Of course, it should be understood that other chlorinating agents work equally as well and are contemplated by the present invention. Such other agents include phosphorus tri- or penta-chloride. The chlorination using $SOCl_2$ is carried out in the following manner: the thionyl chloride, in a large excess, is added slowly to a stirred suspension containing the dihydroxy compound, ethylene dichloride (solvent) and a catalytic amount of pyridine. After addition is complete, the reaction mixture is refluxed for up to 5 hours, and then allowed to stand for a period of up to 20 hours. The product is then filtered off and recrystallized from a suitable solvent, for example, a mixture of dichloroethane and light petroleum.

Alternatively, the dichloro compounds can be obtained directly from p,p'-biphenol by condensation with the appropriate alkylene dichloride, such as ethylene dichloride, in the presence of an alkali metal hydroxide such as sodium or potassium hydroxide. In this procedure, there is employed as reaction medium an organic solvent miscible with water, such as ethanol or dioxane. As in the preparation of the corresponding dihydroxy compounds from p,p'-biphenol, successive condensations can be carried out to obtain dichloro-compounds in which the alkylene side-chains on either side of the molecule are not identical.

The compounds of the present invention have been found to be effective anti-viral agents. They have exhibited activity against the enteroviruses, and in particular against the clinically important enteroviruses of the ECHO (Enteric Cytopathogenic Human Orphan) and Coxsackie groups.

The Coxsackie viruses are an antigenically heterogeneous group and in many cases they will produce pathologic results in suckling mice. They have been isolated from oral secretions and stools. The ECHO viruses are similar to those of the Coxsackie group. They have been found to be cytopathogenic for certain monkey and human cells in tissue culture and have been isolated from feces and blood.

A large variety of enteroviruses, in particular those belonging to the Coxsackie and ECHO groups, have been isolated from the stools of patients suffering from "epidemic gastroenteritis."

The ECHO and Coxsackie viruses are the causative agents of several diseases, such as herpangina, epidemic pleurodynia, and aseptic meningitis. The enteroviruses, particularly ECHO, have been isolated from the stools of infants and children suffering from summer diarrheal disease. The compounds of the present invention, especially 4,4'-bis(3-chloropropoxy)biphenyl, are especially useful in treating gastroenteritis.

Typical test results using 4,4'-bis(3-chloropropoxy)biphenyl, are given below. The tissue culture test is carried out as follows:

Stock solutions of 4,4'-bis(3-chloropropoxy)biphenyl were made up in dimethyl sulphoxide and these were further diluted with distilled water for use in tissue culture assays to a level of 5 µg./ml.

An appropriate dilution of enterovirus is mixed with 4,4'-bis(3-chloropropoxy)biphenyl and inoculated on to a monolayer of money kidney cells grown in petri dishes. A parallel control preparation contains maintenance medium instead of compound. After adsorption period of one hour the medium is replaced by an agar overlay which contains compound in the case of the test preparation. The test and control preparations are incubated for 72 hours, the overlay is removed and cell monolayer stained to permit the counting of virus plaques. A significant reduction in the number of plaques appearing in the test preparation is indicative of antiviral activity due to the compound.

The results obtained with these tests are summarized in the table below:

| Group | Serotype | Tissue culture plaque test |
|---|---|---|
| ECHO | 1 Farouk | +++ |
|  | 2 Cornelis | +++ |
|  | 3 Morrisey | +++ |
|  | 4 * | +++ |
|  | 4 Pesascek | +++ |
|  | 5 Noyce | + |
|  | 6 D'Amori | +++ |
|  | 7 Wallace | +++ |
|  | 8 Bryson | +++ |
|  | 9 Hill | +++ |
|  | 11 Gregory | +++ |
|  | 12 Travis | + |
|  | 13 11-4D | +++ |
|  | 14 Tow | +++ |
|  | 16 ** | +++ |
|  | 17 CHHE-29 | +++ |
|  | 18 Metcalf | 0 |
|  | 19 Burke | ++ |
|  | 20 JV-1 | +++ |
|  | 22 Harris | 0 |
|  | 25 JV-4 | +++ |
| Coxsackie A | 9 | ++ |
|  | 21 Coe | +++ |
| Coxsackie B | 1 P.O | ++ |
|  | 1 Conn-5 | ++ |
|  | 2 Ohio | ++ |
|  | 3 Nancy | 0 |
|  | 4 J.V.B | 0 |
|  | 5 Faulkner | + |
|  | 6 Hammon | 0 |

NOTE:
+++ = Very active, 90-100% plaque reduction and/or 1 $log_{10}$ or greater reduction in virus yields in T.C. with fluid medium.
++ = Standard activity 50-90% plaque inhibition.
+ = Marginal activity.
0 = No activity.
More Recent Strains:
* = Isolated from stool of patient with aseptic meningitis, received from Polio Research Foundation, Johannesburg.
** = Isolated from stool of patient with pneumonia and diarrhea, received from Polio Research Foundation, Johannesburg.

4,4'-bis(3-chloropropoxy)biphenyl was found to have a similar inhibitory activity against all three test ECHO viruses (types 1, 7 and 11) at low dose levels. Active concentrations of this compound ranged from 5 µg./ml. down to 0.6 µg./ml.

The following in vivo test with influenza-infected mice was carried out as follows:

Thirty mice were divided into 3 groups of 10 mice. An oral dose of 4,4-bis(3-chloropropoxy)biphenyl was administered to each mouse in the first group at a dosage rate of 125 mg./kg. body weight; an oral dose of 4,4-bis(3-chloropropoxy)biphenyl was administered to each mouse in the second group at a dosage rate of 250 mg./kg. body weight; and an oral dose of saline was administered to each mouse in the third group, this group being the control group for the test.

All 30 mice were infected intranasally with influenza PR8 virus (dosage: 1,000 mouse $LD_{50}$ units of virus) 1 hour after the administration of the test compound or saline.

The mean survival time of the mice in each group was then determined over a period of 10 days.

The results showed that 4,4-bis(3-chloropropoxy)biphenyl was effective in prolonging the mean survival time of the infected mice.

Although the manifestations of enterovirus infection in man are not uniform, their association with particular virus entities (e.g., in the case of respiratory, respiratory-enteric, diarrhoeal disease, aseptic meningitis, Bornholm disease) has been recognized to represent a causal relationship. See Viral and Rickettsial Infections of Man, F. L. Horsfall and I. Tamm, 4th edit. Pitman Medical, 1965, pp. 492 and 527.

Since the above syndromes cannot be reproduced in animals, studies were conducted in mice to determine the effectiveness of the herein described compounds in: inhibiting virus replication and virus spread; delaying the progression of virus lesions in organs as the pancreatic gland and liver; and inhibiting the formation of virus lesions in the brain.

Coxsackie B1 virus injected into mice intraperitoneally. Under such conditions the virus rapidly replicates in the pancreas and liver, causing extensive necrotic changes and also spreads to the central nervous system. 4,4'-bis(3-chloropropoxy)biphenyl was injected intraperitoneally before and after the virus was administered and tests were made to determine the effectiveness of the compound as an anti-viral agent.

The results showed that 4,4-bis(3-chloropropoxy)bibiphenyl was administered to the virus-infected mice, the virus titre in the pancreas and circulating blood was reduced as was also the virus-induced histopathological damage to the liver and pancreas. There was also an inhibition in virus spread to the brain.

The compounds of the present invention may be administered either alone or preferably in combination with a pharmaceutically-acceptable carrier. For example, they may be administered orally in the form of tablets containing such excipients as starch, lactose and various types of clay, or in capsules, either alone or in admixture with excipients, or in the form of elixirs or suspensions containing flavoring or coloring agents. The compounds can also be administered in the form of a spray directly to the upper respiratory tract. On a body-weight basis, a dosage of about 1 to about 100 milligrams per kilogram per day is appropriate. The physician will determine the dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

The following examples are provided by way of illustration and should not be interpreted as limiting the invention, many variations of which are possible without departing from the spirit or scope thereof.

EXAMPLE I 4,4'-bis(2-hydroxyethoxy)biphenyl

A solution of sodium hydroxide (300 ml., 10% weight/volume) containing p,p'-biphenol (70 g., 0.38 M) is stirred and heated to its boiling point. The source of heat is then removed and 2-bromoethanol (94.1 g., 0.76 M) is added to the stirred solution at a rate such as to maintain the system under reflux. The resulting mixture is then allowed to stand for 15–20 hours and then poured into excess 10% sodium hydroxide solution. The crude product is filtered, dried, recrystallized from absolute ethanol using decolorizing charcoal and recrystallized from abs. ethanol again. The product (70 g.) formed small white plates, M.P. 210–213° C.

*Analysis.*—Calc'd for $C_{16}H_{18}O_4$ (percent): C, 70.1; H, 6.37. Found (percent): C, 70.25; H, 6.42.

EXAMPLE II 4,4'-bis(3-hydroxypropoxy)biphenyl

The above product is prepared using the procedure outlined in Example I wherein a stoichiometric equivalent amount of 3-chloropropanol is used in lieu of 2-bromoethanol with comparable results. The product formed white crystals, M.P. 208–209° C.

*Analysis.*—Calc'd for $C_{18}H_{22}O_4$ (percent): C, 71.50; H, 7.29. Found (percent): C, 71.37; H, 7.24.

EXAMPLE III

The preparation of the ensuing compounds is achieved by means of the procedure described in Example I wherein stoichiometric equivalent amounts of the below cited reagents in lieu of 2-bromoethanol are reacted with p,p'-biphenol and substantial yields of indicated products are obtained:

| Reagent | Product |
| --- | --- |
| 4-bromobutanol | 4,4'-bis(4-hydroxybutoxy)biphenyl. |
| 5-chloropentanol | 4,4'-bis(5-hydroxypentoxy)biphenyl. |
| 6-bromohexanol | 4,4'-bis(6-hydroxyhexoxy)biphenyl. |
| 7-chloroheptanol | 4,4'-bis(7-hydroxyheptoxy)biphenyl. |
| 1-methyl-2-bromoethanol | 4,4'-bis(2-methyl, 2-hydroxyethoxy)biphenyl. |
| 1,2-dimethyl-2-bromoethanol | 4,4'bis(1,2-dimethyl, 2-hydroxyethoxy)-biphenyl. |
| 1-isopropyl-2-chloroethanol | 4,4'-bis(2-isopropyl, 2-hydroxyethoxy)biphenyl. |
| 1-isopropyl-2-methyl-2-chloroethanol | 4,4'-bis(2-isopropyl, 1-methyl-2-hydroxyethoxy)biphenyl. |
| 2-methyl-3-bromopropanol | 4,4'-bis(2-methyl,3-hydroxypropoxy)biphenyl. |
| 2,3-dimethyl-4-chlorobutanol | 4,4'-bis(2,3-dimethyl, 4-hydroxybutoxy)bipheny. |
| 3-methyl-5-bromopentanol | 4,4'-bis(3-methyl, 5-hydroxypentoxy)bipheny. |
| 4-methyl-6-chlorohexanol | 4,4'-bis(3-methyl, 6-hydroxyhexoxy)biphenyl. |

EXAMPLE IV 4,4'-bis(2-chloroethoxy)biphenyl

To a stirred suspension of 4,4'-bis(2-hydroxyethoxy)biphenyl (16 g.) as prepared by Example I in ethylene dichloride (110 ml.) containing pyridine (0.4 ml.) is added thionyl chloride (15 ml.). The mixture is then heated, with stirring, under reflux for 5 hours, and then allowed to stand for 16 hours. The crude product is filtered, and recrystallized from a mixture of dichloroethane and light petroleum (B.P. 60–80° C.) to give 11.7 g. of white leaflet crystals, M.P. 168.5–169° C.

*Analysis.*—Calc'd for $C_{16}H_{16}Cl_2O_2$ (percent): C, 61.7; H, 5.14; Cl, 22.83. Found (percent): C, 61.91; H, 5.14; Cl, 22.57.

EXAMPLE V 4,4'-bis(3-chloropropoxy)biphenyl

The procedure of Example IV is repeated to prepare the above product wherein the following amounts of reagents are used:

4,4'-bis(3-hydroxypropoxy)biphenyl (as prepared by Example II): 23.8 g.
ethylene dichloride: 150 ml.
pyridine: 0.5 ml.

The product is obtained by evaporating the resulting reaction mixture to dryness in vacuo, and recrystallizing the solid residue from an acetone-water mixture. The product formed white platelets, M.P. 123.5–124.5° C.

*Analysis.*—Calc'd for $C_{18}H_{20}Cl_2O_2$ (percent): C. 63.7; H, 5.90; Cl, 20.93. Found (percent): C, 63.88; H, 5.87; Cl, 21.00.

EXAMPLE VI

The products enumerated in Example III are converted to the corresponding bis-chloro compounds in accordance with the method outlined in Example IV using stoichiometric equivalent amounts of thionyl chloride in each instance.

What is claimed is:
1. A compound selected from the group consisting of those of the formula:

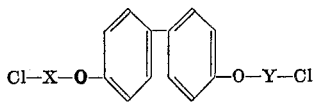

wherein X and Y are each alkylene, straight or branched chain, containing from 2 to 7 carbon atoms.

2. A compound as claimed in claim 1 wherein X and Y are each ethylene.

3. A compound as claimed in claim 1 wherein X and Y are each propylene.

References Cited

UNITED STATES PATENTS 3,437,695   4/1969   Kruse _____ 260—613

FOREIGN PATENTS 1,167,412   8/1958   France _____ 260—613

BERNARD HELFIN, Primary Examiner

U.S. Cl. X.R.

260—999; 424—341